US011268586B2

(12) United States Patent
Bai et al.

(10) Patent No.: US 11,268,586 B2
(45) Date of Patent: Mar. 8, 2022

(54) BRAKE USING MAGNETORHEOLOGICAL TRANSMISSION AND BRAKE-BY-WIRE

(71) Applicant: HEFEI UNIVERSITY OF TECHNOLOGY, Anhui (CN)

(72) Inventors: Xianxu Bai, Anhui (CN); Yang Liu, Anhui (CN); Yang Li, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 42 days.

(21) Appl. No.: 16/473,511

(22) PCT Filed: Dec. 19, 2017

(86) PCT No.: PCT/CN2017/117147
§ 371 (c)(1),
(2) Date: Jun. 25, 2019

(87) PCT Pub. No.: WO2019/052072
PCT Pub. Date: Mar. 21, 2019

(65) Prior Publication Data
US 2020/0049217 A1 Feb. 13, 2020

(30) Foreign Application Priority Data

Sep. 14, 2017 (CN) .......................... 201710828772.8
Dec. 5, 2017 (CN) .......................... 201711268000.X

(51) Int. Cl.
F16D 55/226 (2006.01)
F16D 67/06 (2006.01)
(Continued)

(52) U.S. Cl.
CPC ............. F16D 67/06 (2013.01); F16D 35/00 (2013.01); F16D 37/008 (2013.01); F16D 37/02 (2013.01);
(Continued)

(58) Field of Classification Search
CPC .......... B60T 13/04; B60T 13/74; F16D 37/02; F16D 55/226; F16D 65/183; F16D 67/06
(Continued)

(56) References Cited

U.S. PATENT DOCUMENTS 5,826,683 A * 10/1998 Murata .................... F16D 65/18
188/161
6,367,597 B1 * 4/2002 De Vries ................. B60T 13/74
188/196 V
(Continued)

FOREIGN PATENT DOCUMENTS

CN 2676483 2/2005
CN 201007692 1/2008
(Continued)

Primary Examiner — Christopher P Schwartz
(74) Attorney, Agent, or Firm — Mayer & Williams, PC; Stuart Mayer

(57) ABSTRACT

The present invention discloses a brake-by-wire actuator based on motor-magnetorheological fluid clutch. The system includes a motor, a transmission mechanism and a floating-caliper disc mechanism. The transmission mechanism includes a magnetorheological fluid clutch, a planetary gear set and a ball screw set. The ball screw set includes balls, a ball screw and a sleeve. The floating-caliper disc mechanism includes a brake pad back plate, left and right brake pads, a caliper body, a brake disc and a guide rail. The motor and the magnetorheological fluid clutch cascaded in series, the linear motion of the sleeve of the ball screw set is achieved by the magnetorheological fluid clutch and the transmission mechanism. The sleeve pushes forward the brake pad back plate of the floating-caliper disc mechanism to clamp the brake disc by left and right brake pads, which accomplishes braking. The present invention uses a brake-by-wire actuator based on motor-magnetorheological fluid clutch, which not only has the advantages of fast response and improved (Continued)

braking security, but also solves the problem of the motor stalling during long time braking.

16 Claims, 5 Drawing Sheets

(51) Int. Cl.
    *F16D 35/00*     (2006.01)
    *F16D 37/00*     (2006.01)
    *F16D 37/02*     (2006.01)
    *F16D 65/18*     (2006.01)
    *F16D 121/14*     (2012.01)
    *F16D 121/20*     (2012.01)
    *F16D 121/24*     (2012.01)
    *F16D 125/40*     (2012.01)
    *F16D 125/50*     (2012.01)
(52) U.S. Cl.
    CPC ......... *F16D 55/226* (2013.01); *F16D 65/183* (2013.01); *F16D 2121/14* (2013.01); *F16D 2121/20* (2013.01); *F16D 2121/24* (2013.01); *F16D 2125/40* (2013.01); *F16D 2125/50* (2013.01)

(58) Field of Classification Search
    USPC .. 188/72.2, 72.7, 158–161, 170, 171, 267.1, 188/267.2; 192/12 A, 12 R, 18 A, 18 B, 192/21.5
    See application file for complete search history.

(56) References Cited

U.S. PATENT DOCUMENTS

| | | | |
|---|---|---|---|
| 6,802,402 B2* | 10/2004 | Bausch | B60T 13/04 188/161 |
| 7,891,474 B2* | 2/2011 | McDaniel | F16D 37/02 192/12 A |
| 2013/0087417 A1* | 4/2013 | Yu | B60T 13/741 188/72.3 |
| 2019/0084543 A1* | 3/2019 | Bai | F16D 65/183 |

FOREIGN PATENT DOCUMENTS

| | | |
|---|---|---|
| CN | 105317955 | 2/2016 |
| CN | 106594115 | 4/2017 |
| CN | 107355490 | 11/2017 |
| WO | 2005/124181 | 12/2005 |

* cited by examiner

BRAKE USING MAGNETORHEOLOGICAL TRANSMISSION AND BRAKE-BY-WIRE

TECHNICAL FIELD

The present invention relates to a floating-caliper disc brake, and more particularly to a brake-by-wire actuator using motor-magnetorheological fluid clutch.

BACKGROUND OF THE INVENTION

The background description provided herein is for the purpose of generally presenting the context of the disclosure. All description and statements in this background section, are neither expressly nor impliedly admitted as prior art against the present disclosure.

Brake systems are an extremely important system to ensure the safety of the automobiles. Currently, the most reliable and widely used automotive brake system is the conventional hydraulic disc-type brake for the implementation of various braking purposes. The hydraulic disc-type brake includes a master cylinder, brake pipelines, a wheel cylinder, a caliper body, brake pads and a brake disc. When braking, the braking pressure generated from the master cylinder is delivered by brake pipelines to generate corresponding pressure in each wheel cylinder to push the brake pads and clamp the brake disc, therefore generating friction to achieve braking. However, the necessary pipelines/valves of the conventional hydraulic brake systems greatly increase the complexity of the system and control algorithm and also the system weight (which is unbeneficial to lightweight), and then the cost of the brake systems remains high. At the same time, the long and sophisticated pipelines/valves of conventional hydraulic disc-type brake systems would lead to slow braking pressure transfer and then braking delay, which possibly results in the increase of braking distance and unguaranteed vehicle braking safety.

The automotive industry, represented by intelligent vehicles as the most advanced technology, is assembling the most advanced science and technology of the whole society to innovate with a rapid speed. However, the key automotive hardware for intelligent vehicle software decision-making systems, namely the x-by-wire systems, is not satisfied and currently no updated reliable products can be found. Majority of the current products are actually the compromised improvements on the original systems. Take the brake-by-wire system as an example, the expectation from the automotive industry and the consumers is: safer and lighter. In detail, it is to eliminate all original complex components such as the master cylinder, vacuum booster pump and other parts with high weight, and then to realize a lighter brake system with shorter braking distance. What is more, better performances of anti-lock braking system (ABS), electronic brake force distribution (EBD), electronic stability program (ESP), and autonomous emergency braking (AEB) systems should also be achieved. There are two technical means: (i) to use the motor as the single actuator, and (ii) to add a motor-driving mechanism in the original hydraulic braking system, such as the iBooster system from Robert Bosch GmbH. When working normally, the driver steps down the brake pedal, and the displacement signal is detected by the pedal stroke sensor integrated in the iBooster and is sent to the electronic control unit. The electronic control unit calculates the torque required by the motor and converts the torque to the servo braking of the booster valve body through the two-stage gear unit, thence the output force of the booster valve body and the input force of the booster input axis are converted into braking pressure in the master cylinder to realize braking. The brake system using the motor as a single actuator must solve the problem of the motor stalling properly during long-time braking, because the motor stalling will directly lead to the burnout of the motor and will further cause the failure of the full brake system. Making a tradeoff, the brake efficiency can be improved to some extent by adding a motor-driving mechanism in the original hydraulic braking system. However, it is not possible to eliminate complicated hydraulic pipelines and numerous valve components. We would say that it is not the "real" brake-by-wire system.

SUMMARY

The present invention is to solve the current existing technical problems, providing a brake-by-wire actuator using motor-magnetorheological fluid clutch to meet higher braking performance requirements. The magnetorheological fluid clutch is a typical application using the magnetorheological fluid, which is a smart material with rheological properties. When under electromagnetic fields, its material properties (i.e., the shear stress) can be adjusted rapidly between the Newtonian fluid and semi-solid state material in milliseconds, and this process is continuous and reversible. Magnetorheological fluid clutch has the advantages of fast response, large range of controllable transmission torque, simple structure and low power consumption. Under the control of electromagnetic fields, the transmission torque of magnetorheological fluid clutch can be realized in real time.

The present invention discloses a brake-by-wire actuator based on motor-magnetorheological fluid clutch. The system includes a motor, a transmission mechanism and a floating-caliper disc mechanism. The transmission mechanism includes a magnetorheological fluid clutch, a planetary gear set and a ball screw set. The ball screw set includes balls, a ball screw and a sleeve. The floating-caliper disc mechanism includes a brake pad back plate, left and right brake pads, a caliper body, a brake disc and a guide pin. The motor and the magnetorheological fluid clutch cascaded in series, the linear motion of the sleeve of the ball screw set is achieved by the magnetorheological fluid clutch and the transmission mechanism. The sleeve pushes forward the brake pad back plate to clamp the brake disc through the left and right brake pads of the floating-caliper disc mechanism, which accomplishes braking.

The output shaft of the motor and the input shaft of the magnetorheological fluid clutch are connected through the first coupler, and the driving torque of the motor is transmitted through the magnetorheological fluid clutch.

The magnetorheological fluid clutch includes an input shaft fixed to the input shear plate, a coil winding, an output shaft fixed to the output shear plate and magnetorheological fluid fulfilled in the chamber, wherein the electromagnetic field and the flux lines generated by the coil winding are perpendicular to the magnetorheological fluid between the input shear plate of the input shaft and the output shear plate of the output shaft, and the output torque of the magnetorheological fluid clutch is continuously by tuning the applied current in the coil winding.

The sun gear connects with the output shaft of the magnetorheological fluid clutch via a connecting key, and the carrier is assembled with the sun gear, and also connects with the ball screw through the second coupler, which can realize decreased rotate speed and improved torque.

The sleeve of the screw set is assembled with the brake pad back plate via a connecting key; the right brake pad is fixed to the brake pad back plate, and the left brake pad is fixed to the left caliper arm of the caliper body. When braking, the right brake pad is driven by the sleeve, and is pushed to press the brake disc, meanwhile the counter-acting force acting on the caliper body makes itself moves along with the guide pin, thence the left brake pad fixed to the caliper body presses the brake disc to realize braking.

There is a guiding mechanism in the caliper body, which includes a bracket, a guide pin, and a return spring, wherein the guide pin penetrates the right caliper arm of caliper body, thence the brake pad back plate could move along with the guide pin, and a return spring is installed on the guide pin for adjusting the initial position of the caliper body.

The control process of the brake-by-wire actuator includes the steps of:

a. when braking, the motor and the magnetorheological fluid clutch work concertedly, wherein the motor is applied with a sufficient driving current continuous to provide required driving torque, and the coil winding of the magnetorheological fluid clutch is applied with an appropriate current; the controlled electromagnetic field generated from the coil winding energizes the magnetorheological fluid between the input and output shear plates, which realizes the expected torque transmission from the motor; the sleeve is driven to move forward and push the left and right brake pads to overcome the corresponding resistance and the brake clearance, which accomplishes braking through clamping the brake disc;

b. if the wheel approaches to the locking state, the coil winding is applied with an appropriate low-level current, and the motor is applied with a low-level driving current correspondingly later; the anti-lock brake system enters the stage of reducing the torque;

c. if the wheel is in the optimal braking state, the currents of the coil winding and the motor remain unchanged; the anti-lock brake system enters the stage of holding the torque;

d. if the wheel braking torque is insufficient, the motor is applied with an appropriate high-level driving current firstly, and the coil winding is applied with a high-level current correspondingly later; the anti-lock brake system enters the stage of increasing the torque;

e. at the end of braking, an appropriate reverse driving current is applied to the motor, simultaneously the applied current to the coil winding remains unchanged, thence the ballscrew set moves back to the initial position, and then the currents to the coil winding and the motor are cut off; the caliper body resets via the return spring.

During the braking process, the magnetorheological fluid clutch transmits the driving torque effectively, simultaneously the magnetorheological fluid clutch keeps sliding between the input and output shafts all the time.

The present invention discloses a brake-by-wire actuator based on motor-magnetorheological fluid clutch, wherein the magnetorheological fluid clutch can set at the end of the motor and the planetary gear.

The present invention discloses a brake-by-wire actuator based on motor-magnetorheological fluid clutch, wherein the floating-caliper disc mechanism could be replaced by the floating-wedge disc mechanism.

The present invention discloses a brake-by-wire actuator based on motor-magnetorheological fluid clutch, wherein the magnetorheological fluid clutch could be replaced by the electrorheological fluid clutch or the magnetic particle clutch.

Compared with the prior art, the advantages of the brake-by-wire actuator realized by the magnetorheological clutch as the intermediate device for the transmission of braking driving force are as follows:

1. The present invention can solve the drawbacks of relatively high power consumption caused by the increased vehicle weight due to the complex pipelines and valve components. The present invention can solve the problems of the environmental pollution and collision caused by hydraulic oil leakage in the hydraulic system.
2. The present invention can effectively solve the problem of motor stalling during long time braking.
3. The present invention uses the motor and the magnetorheological fluid clutch cascaded in series as a combined driving assembly for the new brake-by-wire system, which can enhance the response speed of brake system and is beneficial to the optimization of the performance of the brake system.
4. The present invention is beneficial to realizing better performances of the active safety control systems of ABS, EBD, ESP and AEB.

BRIEF DESCRIPTION OF THE DRAWINGS

The present disclosure will become more fully understood from the detailed description and the accompanying drawings, wherein.

Notation: the sequential numbers and the corresponding parts in the FIGs are listed.

1 motor, 2 coupler, 3 magnetorheological fluid clutch, 4 sun gear, 5 ring gear, 6 planetary gear, 7 carrier, 8 ball, 9 ball screw, 10 sleeve, 11 floating-caliper disc mechanism, 12 caliper body, 13 left brake pad, 14 brake disc, 15 right brake pad, 16 brake pad back plate, 17 bracket, 18 guide pin, 19 return spring, 20a planetary gear set, 20b ball screw set, 21 input shaft, 22 input shear plate, 23 magnetic flux lines, 24 back cover of clutch, 25 shell, 26 coil winding, 27 solenoid bracket, 28 non-magnetic material, 29 spacer rings, 30 output shear plate, 31 output shaft, 32 magnetorheological fluid, 33 sealing ring, 34 conducting ring, 35 high-voltage power source, 36 output plate of clutch, 37 input plate of clutch, 38 insulating sleeve, 39 check ring, 40 spacer bush 1, 41 insulating plate, 42 spacer bush 2, 43 electrorheological fluid, 44 driven rotor, 45 magnetic powder, 46 driving rotor, 47 stator, 48 rotor, 49 movable wedge, 50 static wedge, 51 rollers, 52 floating-wedge disc mechanism, 53 upper brake pad, 54 lower brake pad.

DETAILED DESCRIPTION OF EMBODIMENTS

Figure 1:
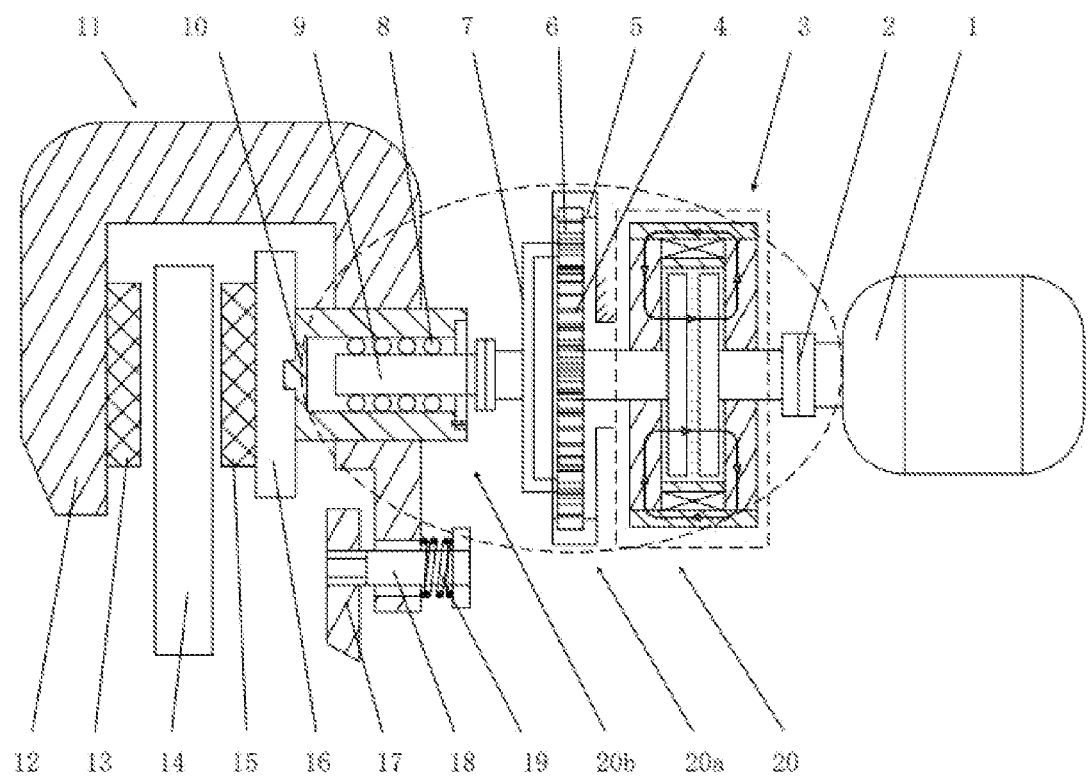
FIG. 1 shows a configuration of the present exemplary embodiment using a brake-by-wire actuator based on motor-magnetorheological fluid clutch.

FIG. 1 shows a brake-by-wire actuator based on motor-magnetorheological fluid clutch, which in detail consists of a motor 1, a transmission mechanism 20 and a floating-caliper disc mechanism 11. The driving torque of the motor 1 is transmitted by the magnetorheological fluid clutch 3 in real time.

Figure 2:
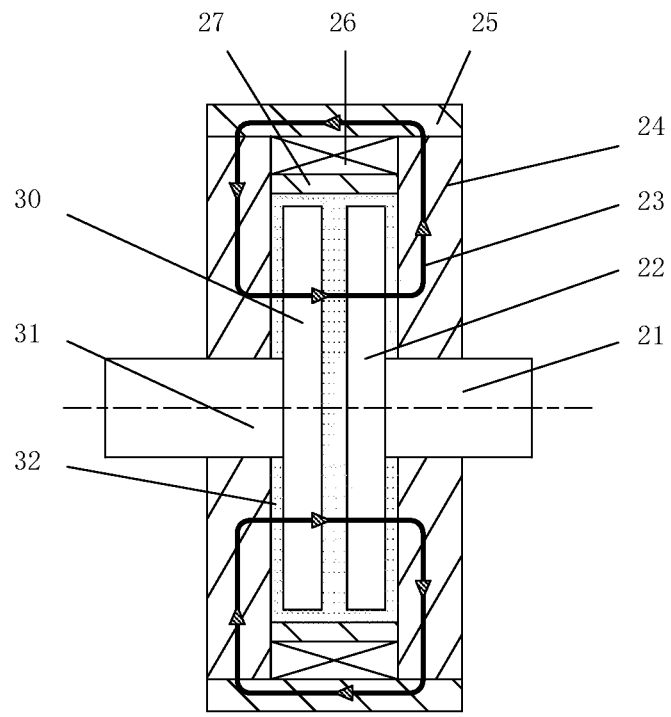
FIG. 2 shows an enlarged sectional illustration of the magnetorheological fluid clutch of FIG. 1.

As shown in FIGS. 1 and 2, the transmission mechanism 20 includes a magnetorheological fluid clutch 3, a planetary gear set 20a and a ball screw set 20b. The magnetorheological fluid clutch 3 includes an input shaft 21 fixed to the input shear plate 22, a coil winding 26, an output shaft 31 fixed to the output shear plate 30 and magnetorheological fluid 32 fulfilled in the chamber. The planetary gear set 20a includes a sun gear 4, a ring gear 5, a planetary gear 6 and a carrier 7. The ball screw set 20b includes balls 8, a ball screw 9 and a sleeve 10. The electromagnetic field and the flux lines generated by the coil winding 26 are perpendicular to the magnetorheological fluid 32 between the input shear plate 22 of the input shaft 21 and the output shear plate 30 of the output shaft 31, and the output torque of the magnetorheological fluid clutch 3 is continuously by tuning the applied current in the coil winding. The sun gear 4 of the planetary gear set connects fixedly with the output shaft 31 of the magnetorheological fluid clutch 3 via a connecting key, and the carrier 7 is assembled with the sun gear 4 coaxially. Simultaneously it connects with the ball screw 9 through the second coupler 2 in FIG. 7.

FIG. 1 shows the sleeve 10 of the ball screw set 20b is assembled with the brake pad back plate 16 via a connecting key, and the right brake pad 15 is fixed to the brake pad back plate 16, the left brake pad 13 is fixed to the left caliper arm of the caliper body 12. There is a guiding mechanism in the caliper body 12, which includes a bracket 17, a guide pin 18, and a return spring 19, wherein the guide pin 18 penetrates the right arm of the caliper body 12, thence the brake pad back plate 16 could move along with the guide pin 18, and a return spring 19 is installed onto the guide rail 18 for adjusting the initial position of the caliper body 12. When braking, the right brake pad 15 is driven by the sleeve 10, and is pushed to clamp the brake disc 14, meanwhile the counter-acting force acting on the caliper body 12 makes itself move along with the guide rail 18, thence the left 13 and right brake pads 15 clamp the brake disc 14 to realize braking.

Setting the Brake Control Modes:
(a) when braking, the motor 1 and the magnetorheological fluid clutch 3 work concertedly, wherein the motor 1 is applied with a sufficient driving current continuously to provide required driving torque, and the coil winding 26 of the magnetorheological fluid clutch 3 is applied with an appropriate current; the controlled electromagnetic field generated from the coil winding 26 energizes the magnetorheological fluid 32 between the input 22 and output shear plates 30, which realizes the expected torque transmission from the motor 1; the sleeve 10 is driven to move forward and push the left 13 and right brake pads 15 to overcome the corresponding resistance and the brake clearance, which accomplishes braking through clamping the brake disc 14.
(b) if the wheel approaches to the locking state, the coil winding 26 of the magnetorheological fluid clutch 3 is applied with an appropriate low-level current, and the motor 1 is applied with a low-level driving current correspondingly later; the anti-lock brake system enters the stage of reducing the torque.
(c) if the wheel is in the optimal braking state, the currents of the coil winding 26 and the motor 1 remain unchanged; the anti-lock brake system enters the stage of holding the torque.
(d) if the wheel braking torque is insufficient, the motor 1 is applied with an appropriate high-level driving current firstly, and the coil winding 26 is applied with a high-level current correspondingly later; the anti-lock brake system enters the stage of increasing the torque.
(e) at the end of braking, a reverse driving current is applied to the motor 1, simultaneously the applied current to the coil winding 26 of the magnetorheological fluid clutch 3 remains unchanged, thence the ballscrew set 20b moves back to the initial position, and then the currents of the coil winding 26 and the motor 1 are cut off; the caliper body 12 resets via the return spring 19.

Figure 3:
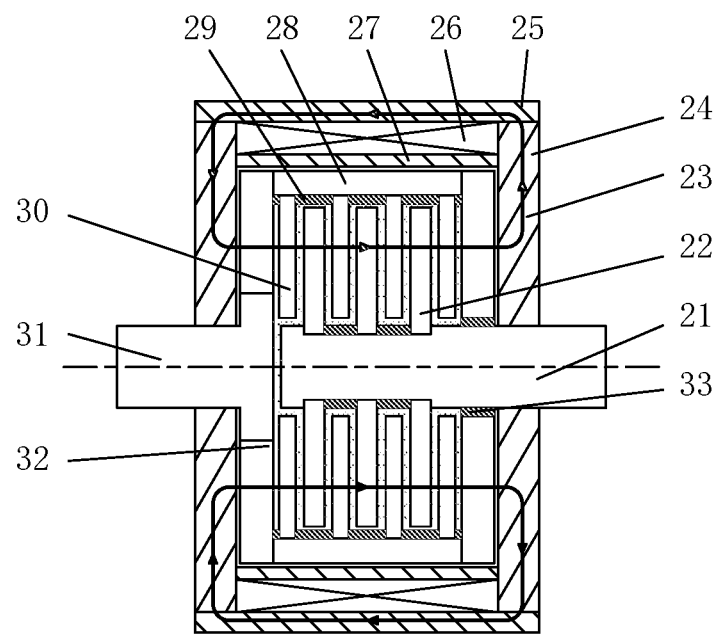
FIG. 3 shows a configuration of a second exemplary embodiment of the magnetorheological fluid clutch in FIG. 1.

Referring now to FIG. 3, another embodiment of the magnetorheological fluid clutch is shown. The input shaft 21 and output shaft 31 assemble coaxially, and they are equipped with multiple shear plates, which located by spacer rings 29, and the magnetorheological fluid 32 are fully filled in the chamber; using a sealing ring 33 keeps leakproofness in the contact between the input 21 and output shafts 31. The electromagnetic field and the flux lines are generated by the coil winding 26, and the input torque would be transmitted to the output shaft 31 of the magnetorheological fluid clutch 3.

Figure 4:
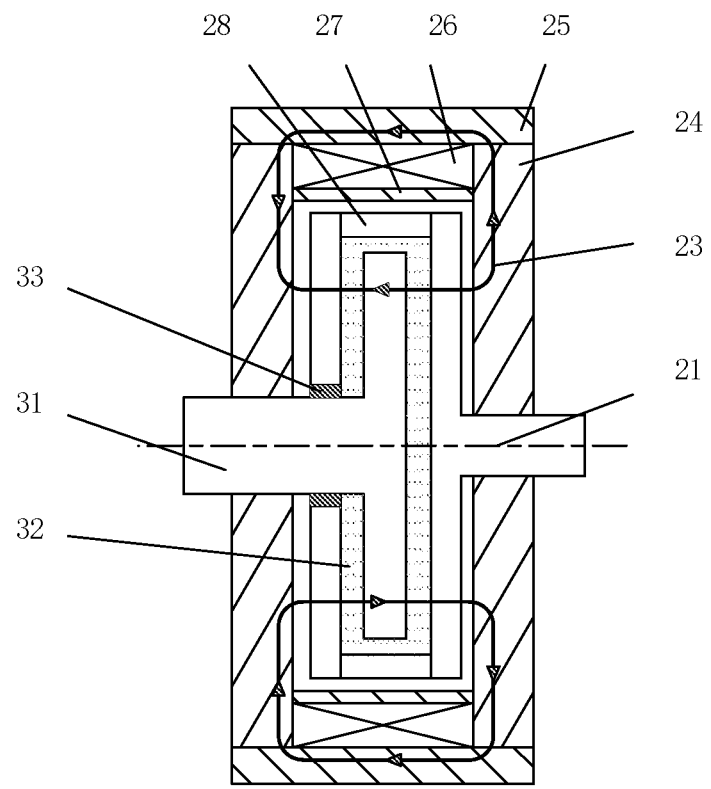
FIG. 4 shows a configuration of a third exemplary embodiment of the magnetorheological fluid clutch in FIG. 1.

Referring now to FIG. 4, another embodiment of the magnetorheological fluid clutch is shown. The input shaft 21 and output shaft 31 assemble coaxially, and at one end of the output shaft 31, the radial dimension is increased to form a "flywheel" structure, which could increase the working range of the magnetorheological fluid 32. Simultaneously, the magnetorheological fluid 32 is fully filled in the chamber. Using a sealing ring 33 keeps leakproofness in the contact between the input 21 and output 31 shafts. The electromagnetic field and the flux lines are generated by the coil winding 26, and the input torque would be transmitted to the output shaft 31 of the magnetorheological fluid clutch 3.

Figure 5:
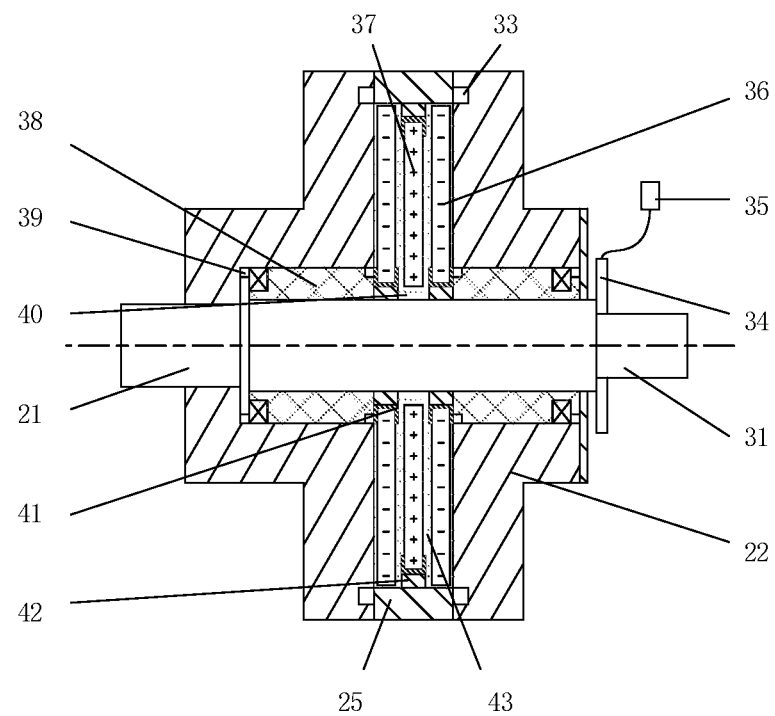
FIG. 5 shows a configuration of a fourth exemplary embodiment of the magnetorheological fluid clutch in FIG. 1.

Referring now to FIG. 5, another embodiment of the magnetorheological fluid clutch is shown. An electrorheological fluid clutch is used to replace the magnetorheological fluid clutch 3 as shown in FIG. 1, wherein the electrorheological fluid clutch includes input and output shafts 21,31, a conducting ring 34, a high-voltage power source 35, input and output plates of clutch 37,36, an insulating sleeve 38, a check ring 39, an insulating plate 41, a spacer bush (40 and 42) and electrorheological fluid 43 fully filled in the chamber. According to the structure of the electrorheological fluid clutch, the clutch structure should be insulated in two parts: (i) the insulation between the input 21/output 31 shaft and the back cover of clutch 22, thence the insulating sleeve 38 is installed, and (ii) the insulation between the input plate of clutch 37 and the output plate of clutch 36, thence the spacer bush (40 and 42) are installed between the input plate 37 and the output plates of clutch 36. In addition, there is a sealing ring 33 in the contact between the back cover of clutch 22 and shell 25, which could prevent the leakage of the electrorheological fluid 32.

Figure 6:
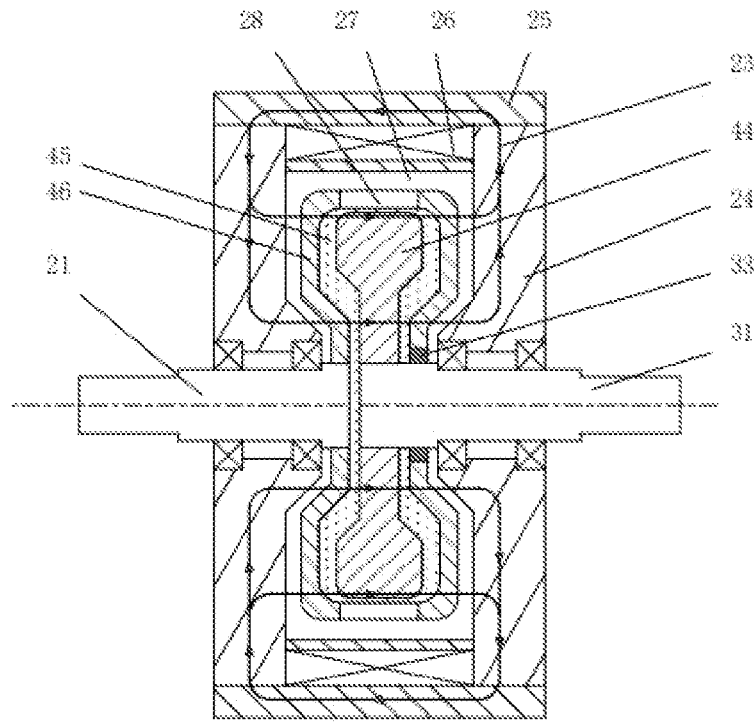
FIG. 6 shows a configuration of a fifth exemplary embodiment of the magnetorheological fluid clutch in FIG. 1.

Referring now to FIG. 6, another embodiment of the magnetorheological fluid clutch is shown. A magnetic particle clutch is used to replace the magnetorheological fluid clutch 3 as shown in FIG. 1, wherein the magnetic particle clutch includes input 21 and output shafts 31, a coil winding 26, a driven rotor 44, magnetic powder 45 and driving rotor 46; the driving rotor 46 is fixed to the input shaft 21, and the driven rotor 44 is fixed to the output shaft 31. The driving rotor 46 and driven rotor 44 are separated via a sealing rings 33, and a working gap is formed between the driving 46 and driven rotors 44, thence the magnetic powder 45 with high-permeability and high heat resistance performance is added into the gap. The electromagnetic field and the flux lines are generated by the coil winding 26, and the input torque would be transmitted to the output shaft 31 of the magnetic particle clutch via the magnetic powder 45.

Figure 7:
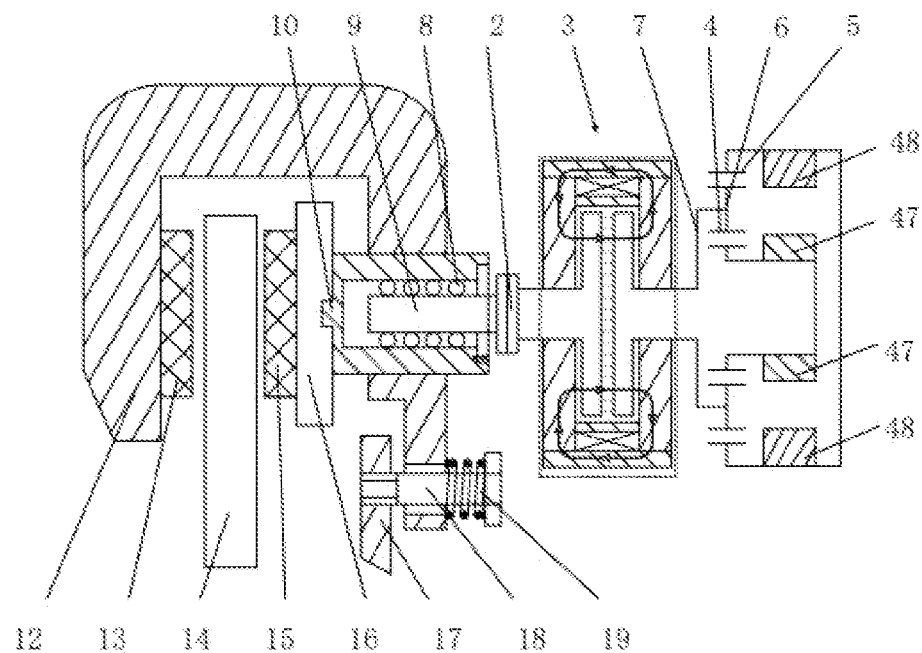
FIG. 7 shows a configuration of a second exemplary embodiment.

Referring now to FIG. 7, another embodiment of the present invention is shown. This exemplary embodiment sets the magnetorheological fluid clutch 3 at the end of the motor 1 and the planetary gear set 20a, and the output shaft 31 of the magnetorheological fluid clutch 3 acts on the brake pad back plate 16. The motor includes a stator 47 and a rotor 48, wherein the ring gear 5 of the planetary gear set 20a is fixed to the rotor 48, the sun gear 4 of the planetary gear set 20a is fixed to the stator 47 and the carrier 7 is fixed to the input shaft 21 of the magnetorheological fluid clutch 3, which is driven by the motor 1.

Figure 8:
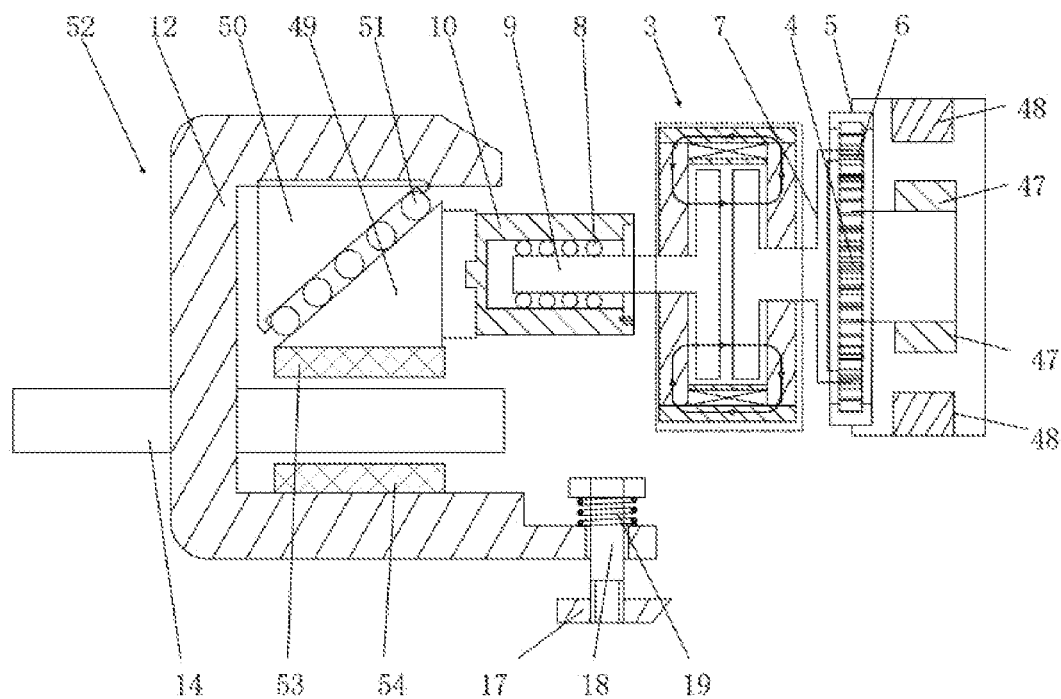
FIG. 8 shows a configuration of a third exemplary embodiment.

Referring now to FIG. 8, yet another embodiment of the present invention is shown. The floating-wedge disc mechanism 52 is used to replace the floating-caliper disc mechanism 11, wherein the floating-wedge disc mechanism 52 includes movable and static wedges 49,50, rollers 51, upper and lower brake pads 53,54. The static wedge 50 is fixed to the caliper body 12, and the movable wedge 49 with upper brake pad 53 is fixed to the brake pad back plate 16, which could move in a straight line along with the rollers 51.

Setting the Brake Control Modes:
(f) When braking, the motor 1 and the magnetorheological fluid clutch 3 work concertedly, wherein the motor 1 is applied with a sufficient driving current continuously to provide required driving torque, and the coil winding 26 of the magnetorheological fluid clutch 3 is applied with an appropriate current; the controlled electromagnetic field generated from the coil winding 26 energizes the magnetorheological fluid 32 between the input 22 and output shear plates 30, which realizes the expected torque transmission from the motor 1; the sleeve 10 is driven move forward and push the upper 53 and lower brake pads 54 to overcome the corresponding resistance and the brake clearance, which accomplishes braking through clamping the brake disc 14;
(g) if the wheel approaches to the locking state, the coil winding 26 of the magnetorheological fluid clutch 3 is applied with an appropriate low-level input currents; and the motor 1 is applied with a low-level driving current later; the anti-lock brake system enters the stage of reducing the torque;
(h) if the wheel is in the optimal braking state, the currents of the coil winding 26 and the motor 1 remain unchanged; the anti-lock brake system enters the stage of holding the torque;
(i) if the wheel braking torque is insufficient, the motor 1 is applied with an appropriate high-level driving current firstly, and the coil winding 26 is applied with a high-level current later; the anti-lock brake system enters the stage of increasing the torque;
(j) when the braking demand terminates, an appropriate reverse driving current is applied to the motor 1 firstly, simultaneously the applied current of the coil winding 26 remains unchanged, therefore the ballscrew set 20b moves back to the initial position, and then the currents of the coil winding 26 and the motor 1 are cut off; the caliper body 12 resets via the return spring 19.

Figure 9:
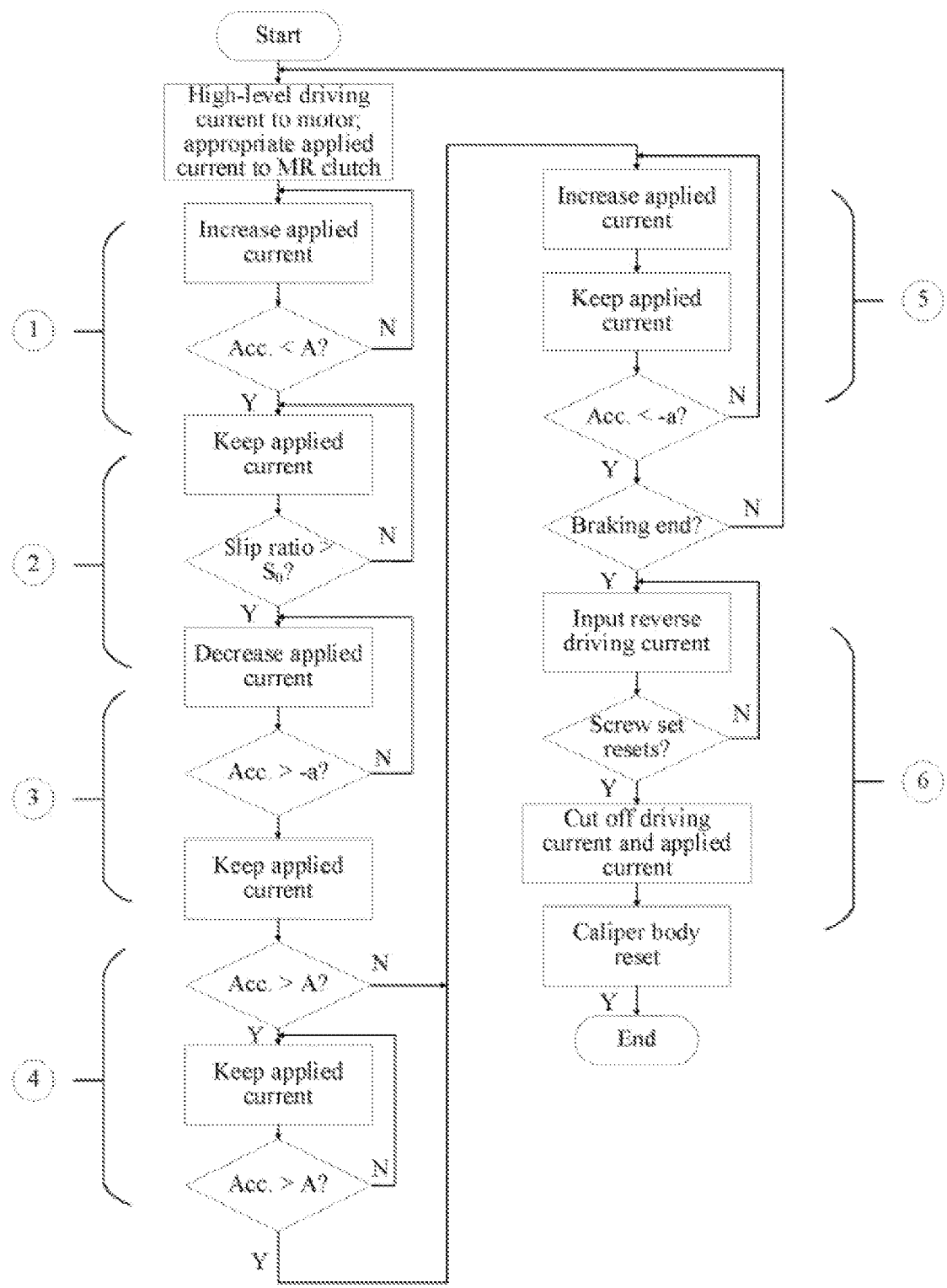
FIG. 9 shows a control flow chart of the exemplary embodiments.

Referring now to FIG. 9, control flow chart of the logic threshold method of ABS used in the automotive brake system based on the present invention is shown. At the start stage of ABS, the motor 1 and the magnetorheological fluid clutch 3 work concertedly, the motor 1 is applied with a sufficient driving current continuously to provide the required driving torque, and the coil winding 26 is applied with an appropriate current to generate electromagnetic field, then the applied current of the coil winding 26 increases, which results in the increasing of braking torque. When the braking torque reaches the preset value, the driving current to the motor 1 remains unchanged, and the pressing force of the magnetorheological fluid clutch is controlled to realize the ABS function by adjusting the applied current of the coil winding 26. At the end of the stage ①, the wheel acceleration reaches the preset threshold −a, the applied current of the coil winding 26 remains unchanged so that the wheels are fully braked. When the braking process enters stage ②, there is no need to reduce the applied current at this time until the slip ratio exceeds the reference slip ratio threshold $S_0$. At this point, reducing the applied current of the coil winding 26, then the control process enters the stage ③. Since the applied current reduces, the braking torque reduces and the wheel is accelerated by the inertia, which means the wheel deceleration starts to rise and would be higher than the preset threshold value −a. Thence the applied current of the coil winding 26 remains unchanged, the control process enters stage ④. During this time, since the clamping force is insufficient, the wheel continues to accelerate, simultaneously the applied current of coil winding 26 remains unchanged, until the acceleration exceeds the preset threshold valve a. At the end of stage ④, if the wheel acceleration exceeds the preset upper bound acceleration threshold valve A (A>a), the applied current of coil winding 26 increases until the wheel acceleration is below the threshold valve A and then remaining the applied current unchanged, until the wheel acceleration is below the threshold valve a. Then the control process enters stage ⑤, in this stage, the applied current of coil winding 26 is continuously switched by increasing or holding until the wheel acceleration is again lower than the threshold value −a. All stages of ①, ②, ③, ④, and ⑤ are a complete cycle of ABS, then it is time to determine whether to repeat or terminate the braking process. If the braking demand terminates, then the control process enters stage ⑥, during this stage, an appropriate reverse driving current is applied to the motor 1 firstly, simultaneously the applied current to coil winding 26 remains unchanged, thence the ballscrew set 20b moves back to the initial position. Then the currents of the coil winding 26 and the motor 1 are cut off, and the caliper body 12 resets via the return spring 19.

What is claimed is:
1. A brake-by-wire actuator based on motor-magnetorheological fluid clutch, an electroheoligical clutch or a magnetic powder clutch, comprising:
  a motor, a transmission mechanism and a floating-caliper disc mechanism, wherein the transmission mechanism includes a magnetorheological fluid clutch, an electrorheological clutch or a magnetic powder clutch, a planetary gear set and a ball screw set;
  the ball screw set includes balls, a ball screw and a sleeve;
  the floating-caliper disc mechanism includes a brake pad back plate, left and right brake pads, a caliper body, a brake disc and a guide pin;

the motor and the magnetorheological fluid clutch cascaded in series, a sleeve, of which the linear motion is achieved by the transmission mechanism, and the sleeve pushes forward the brake pad back plate of the floating-caliper disc mechanism to clamp the brake disc by left and right brake pads, which accomplishes braking.

2. The brake-by-wire actuator based on motor-magnetorheological fluid clutch as in claim 1, wherein an output shaft of the motor is connected in series by coupling with an input shaft of the magnetorheological fluid clutch, and the driving torque of the motor is transmitted by the magnetorheological fluid clutch in real time.

3. The brake-by-wire actuator based on motor-magnetorheological fluid clutch as in claim 1, wherein the magnetorheological fluid clutch includes an input shaft fixed to an input shear plate, a coil winding, an output shaft fixed to the output shear plate and magnetorheological fluid fulfilled in the chamber;

an electromagnetic field and the flux lines generated by the coil winding are perpendicular to the magnetorheological fluid between the input shear plate of the input shaft and the output shear plate of the output shaft, and the output torque of the magnetorheological fluid clutch is continuously controlled by tuning the applied current of the coil winding.

4. The brake-by-wire actuator based on motor-magnetorheological fluid clutch as in claim 1, wherein the planetary gear set includes a sun gear, a ring gear, a planetary gear and a carrier;

the sun gear connects with the output shaft of the magnetorheological fluid clutch by a shaft key, and the carrier is assembled with the sun gear coaxially, and also it is connected in series by coupling with the ball screw to realize decreasing rotate speed and improving torque.

5. The brake-by-wire actuator based on motor-magnetorheological fluid clutch as in claim 1, wherein the sleeve is assembled with the brake pad back plate via a connecting key; the right brake pad is fixed to the brake pad back plate, and the left brake pad is fixed to the caliper; the sleeve is driven to move linearly, and pushes forward the brake pad back plate of the floating-caliper disc mechanism to clamp the brake disc by left and right brake pads, which accomplishes braking.

6. The brake-by-wire actuator based on motor-magnetorheological fluid clutch as in claim 1, comprising a guide rail penetrating the right caliper arm of the caliper body;

a return spring, which is installed on the guide rail for adjusting the initial position of the caliper body.

7. The brake-by-wire actuator based on motor-magnetorheological fluid clutch as in claim 1, wherein the control process includes the steps of:

(a) when braking, the motor and the magnetorheological fluid clutch work concertedly, wherein the motor is applied with a sufficient driving current continuously to provide required driving torque; the coil winding of the magnetorheological fluid clutch is applied with an appropriate current; the controlled electromagnetic field generated from the coil winding energizes the magnetorheological fluid between the input and output shear plates, which realizes the expected torque transmission from the motor; the sleeve is driven to move linearly and push the left and right brake pads to overcome the corresponding resistance and the brake clearance, which accomplishes braking through clamping the brake disc;

(b) if the wheel approaches to the locking state, the coil winding of the magnetorheological fluid clutch is applied with an appropriate low-level current, and the motor is applied with a low-level driving current later; the anti-lock braking system enters the stage of reducing the torque;

(c) if the wheel is in the optimal braking state, the current of the motor and the coil winding remain unchanged; the anti-lock braking system enters the stage of holding the torque;

(d) if the wheel braking torque is insufficient, the motor is applied with high-level driving current firstly, and the coil winding is applied with a higher-level current later; the anti-lock braking system enters the stage of increasing the torque;

(e) at the end of braking, an appropriate reverse driving current is applied to the motor, simultaneously the applied current of the coil winding remains unchanged, therefore the screw set moves back to the initial position, and then the currents of the coil winding and the motor are cut off; the caliper body resets via the return spring.

8. The brake-by-wire actuator based on motor-magnetorheological fluid clutch as in claim 1, wherein the magnetorheological fluid clutch sets at the end of the motor and the planetary gear set;

the motor includes a stator and a rotor;

the ring gear of the planetary gear set is fixed to the rotor, and the sun gear of the planetary gear set is fixed to the stator, and also the carrier is fixed to the input shaft of the magnetorheological fluid clutch.

9. The brake-by-wire actuator based on motor-electrorheological fluid clutch as in claim 1, wherein an output shaft of the motor is connected in series by coupling with an input shaft of the magnetorheological fluid clutch, and the driving torque of the motor is transmitted by the electrorheological fluid clutch in real time.

10. The brake-by-wire actuator based on motor-electrorheological fluid clutch as in claim 1, wherein the electrorheological fluid clutch includes input and output shafts, a conducting ring, a high-voltage power source, input and output plates of clutch, an insulating sleeve, a check ring, an insulating plate, a spacer bush and electrorheological fluid fulfilled in the chamber;

the electrorheological fluid clutch set at the end of the motor and the planetary gear.

11. The brake-by-wire actuator based on motor-magnetic particle clutch as in claim 1, wherein an output shaft of the motor is connected in series by coupling with an input shaft of the magnetic particle clutch, and the driving torque of the motor is transmitted by the magnetic particle clutch in real time.

12. The brake-by-wire actuator based on motor-magnetic particle clutch as in claim 1, wherein the magnetic particle clutch includes input and output shafts, a coil winding, a driven rotor, a driving rotor and magnetic powder;

the magnetic particle clutch set at the end of the motor and the planetary gear.

13. A brake-by-wire actuator based on motor-magnetorheological fluid clutch, comprising:

a motor, a transmission mechanism and a floating-wedge disc mechanism, wherein the transmission mechanism includes a magnetorheological fluid clutch, an electrorheological clutch or a magnetic powder clutch, a planetary gear set and a screw set;

the screw set includes balls, a ball screw and a sleeve;

the floating-wedge disc mechanism includes a brake pad back plate, movable and static wedges, rollers, upper and lower brake pads, a caliper body, a brake disc and a guide pin;

the motor and the magnetorheological fluid clutch cascaded in series;

the movable wedge is fitted with upper brake pad, and the lower brake pad is mounted on one side of the caliper body;

a sleeve, of which the linear motion is achieved by the transmission mechanism, is fixed to the brake pad back plate which installs the movable wedge, and the static wedge is mounted on the other side of the caliper body, thence the sleeve pushes forward the brake pad back plate to clamp the brake disc by upper and lower brake pads, which accomplishes braking.

14. The brake-by-wire actuator based on motor-magnetorheological fluid clutch as in claim 13, wherein the static wedge (50) is fixed to the caliper body, and the movable wedge with upper brake pad is fixed to the brake pad back plate, thence the movable wedge could move in a straight line along with the rollers;

the rollers are installed between the bevel of the static wedge and the movable wedge, and the self-reinforcing effect in braking process is realized through the interaction between the two bevels.

15. The brake-by-wire actuator based on motor-magnetorheological fluid clutch as in claim 13, comprising a guide pin penetrating the right caliper arm of the caliper body;

a return spring, which is installed on the guide pin for adjusting the initial position of the caliper body.

16. The brake-by-wire actuator based on motor-magnetorheological fluid clutch as in claim 13, wherein the control process includes the steps of:

(a) when braking, the motor and the magnetorheological fluid clutch work concertedly, wherein the motor is applied with a sufficient driving current continuously to provide required driving torque, and the coil winding of the magnetorheological fluid clutch is applied with an appropriate current; the controlled electromagnetic field generated from the coil winding energizes the magnetorheological fluid between the input and output shear plates, which realizes the expected torque transmission from the motor; the sleeve is driven to move forward and push the left and right brake pads overcome the corresponding resistance and the brake clearance, which accomplishes braking through clamping the brake disc;

(b) if the wheel approaches to the locking state, the coil winding is applied with an appropriate low-level current, and the motor is applied with a low-level driving current later; the brake system enters the stage of reducing the torque;

(c) if the wheel is in the optimal braking state, the currents of the coil winding and the motor remain unchanged; the brake system enters the stage of holding the torque;

(d) if the wheel braking torque is insufficient, the motor is applied with a high-level driving current, and the coil winding is applied with a high-level current later; the brake system enters the stage of increasing the torque;

(e) when the braking demand terminates, an appropriate reverse driving current is applied to the motor, simultaneously the applied current of coil winding remains unchanged, thence the ball screw set moves back to the initial position, and then the currents of the coil winding and the motor are cut off; the caliper body resets via the return spring.

\* \* \* \* \*